(12) United States Patent
Yamashita et al.

(10) Patent No.: US 12,624,968 B2
(45) Date of Patent: May 12, 2026

(54) ELECTRODE STRUCTURE

(71) Applicant: Panasonic Automotive Systems Co., Ltd., Kanagawa (JP)

(72) Inventors: Yasuhiro Yamashita, Osaka (JP); Takumi Yamada, Kyoto (JP); Takateru Sawada, Osaka (JP); Tadashi Ezaki, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 129 days.

(21) Appl. No.: 18/615,611

(22) Filed: Mar. 25, 2024

(65) Prior Publication Data

US 2024/0337512 A1      Oct. 10, 2024

(30) Foreign Application Priority Data

Apr. 4, 2023     (JP) ................................. 2023-060880

(51) Int. Cl.
| | |
|---|---|
| *G01R 27/26* | (2006.01) |
| *B62D 1/06* | (2006.01) |
| *G01D 5/24* | (2006.01) |
| *H05B 3/26* | (2006.01) |

(52) U.S. Cl.
CPC .............. *G01D 5/24* (2013.01); *B62D 1/065* (2013.01); *H05B 3/26* (2013.01)

(58) Field of Classification Search
CPC .......... G01D 5/24; B62D 1/046; B62D 1/065; H05B 3/26; H05B 3/58
See application file for complete search history.

(56) References Cited

U.S. PATENT DOCUMENTS

| | | | |
|---|---|---|---|
| 2011/0073582 A1* | 3/2011 | Morita | B62D 1/065 |
| | | | 219/204 |
| 2020/0017136 A1 | 1/2020 | Lammers et al. | |
| 2021/0016819 A1* | 1/2021 | Urushibata | B62D 1/06 |
| 2021/0331203 A1* | 10/2021 | Nakano | H04R 19/04 |
| 2021/0389842 A1* | 12/2021 | Fujiyoshi | G01B 7/00 |
| 2023/0067577 A1* | 3/2023 | Yamada | B62D 1/06 |

FOREIGN PATENT DOCUMENTS

| | | |
|---|---|---|
| WO | WO 2018145868 A1 | 8/2018 |

* cited by examiner

*Primary Examiner* — Thang X Le
(74) *Attorney, Agent, or Firm* — Seed Intellectual Property Law Group LLP

(57)      ABSTRACT

An electrode structure includes: an insulating support that is arranged so as to face a core metal of a steering wheel; a first electrode that is arranged on an opposite side of the insulating support relative to a side of the insulating support facing the core metal, and includes a metal plate; a first resin layer that is arranged on an opposite side of the first electrode relative to a side of the first electrode facing the insulating support; and a second electrode that is arranged on an opposite side of the first resin layer relative to a side of the first resin layer facing the first electrode, and includes a metal plate. The insulating support includes an engagement portion that engages an engagement-target portion provided on the core metal.

12 Claims, 7 Drawing Sheets

ELECTRODE STRUCTURE

CROSS REFERENCE TO RELATED APPLICATION

The present application is based on and claims priority of Japanese Patent Application No. 2023-060880 filed on Apr. 4, 2023.

FIELD

The present disclosure relates to an electrode structure.

BACKGROUND

Patent Literature (PTL) 1 discloses a method of making a cut in the foam of a steering wheel using a cutting tool to introduce an electric conductor of a sensor into each of a first layer and a second layer of the cut.

CITATION LIST

Patent Literature

PTL 1: International Publication No. 2018/145868

SUMMARY

However, the method according to PTL 1 can be improved upon.

In view of this, the present disclosure provides an electrode structure capable of improving upon the above related art.

An electrode structure according to one aspect of the present disclosure includes: an insulating support that is arranged so as to face a core metal of a steering wheel; a first electrode that is arranged on an opposite side of the insulating support relative to a side of the insulating support facing the core metal, and includes a metal plate; a first resin layer that is arranged on an opposite side of the first electrode relative to a side of the first electrode facing the insulating support; and a second electrode that is arranged on an opposite side of the first resin layer relative to a side of the first resin layer facing the first electrode, and includes a metal plate. The insulating support includes an engagement portion that engages an engagement-target portion provided on the core metal.

An electrode structure according to the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
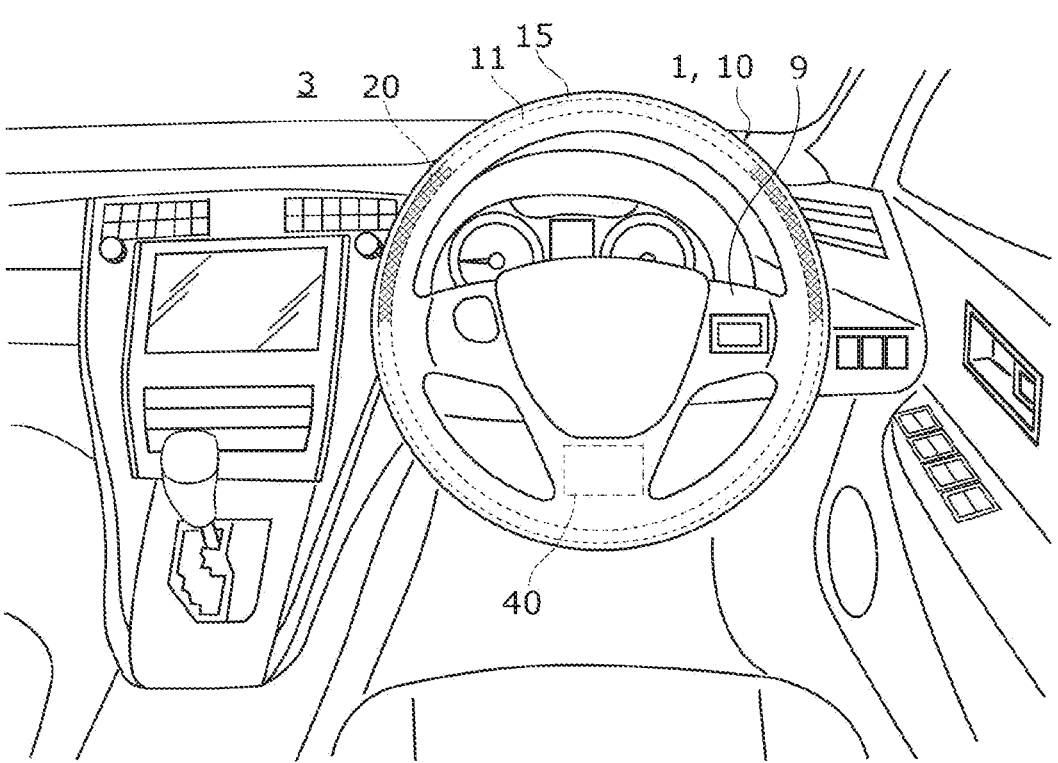
FIG. 1 is a diagram illustrating a passenger cabin of a vehicle in which a steering wheel according to an embodiment is provided.

Hereinafter, embodiments will be described in detail with reference to the drawings.

Note that the embodiments below each describe a general or specific example. The numerical values, shapes, materials, elements, the arrangement and connection of the elements, steps, orders of the steps etc. illustrated in the following embodiments are mere examples, and are not intended to limit the present disclosure. Furthermore, among the elements in the embodiments below, those not recited in any one of the independent claims will be described as optional elements.

In addition, the drawings are schematic diagrams, and do not necessarily provide strictly accurate illustrations. Throughout the drawings, the same reference numeral is given to the same element.

In the following embodiments, expressions such as approximately equal intervals and T-shaped are used. For example, the expressions approximately equal intervals and T-shaped do not only mean exactly equal intervals and exactly T-shaped, but also mean substantially equal intervals and substantially T-shaped, including an error of about several percent. More specifically, the expressions approximately equal intervals and T-shaped mean equal intervals and T-shaped to an extent that the advantageous effects of the present disclosure can be achieved. The same applies to other expressions using "approximately" and "shaped".

EMBODIMENT

[Configuration]

First, the configuration of steering wheel 1 will be described with reference to FIG. 1 through FIG. 6.

Figure 2:
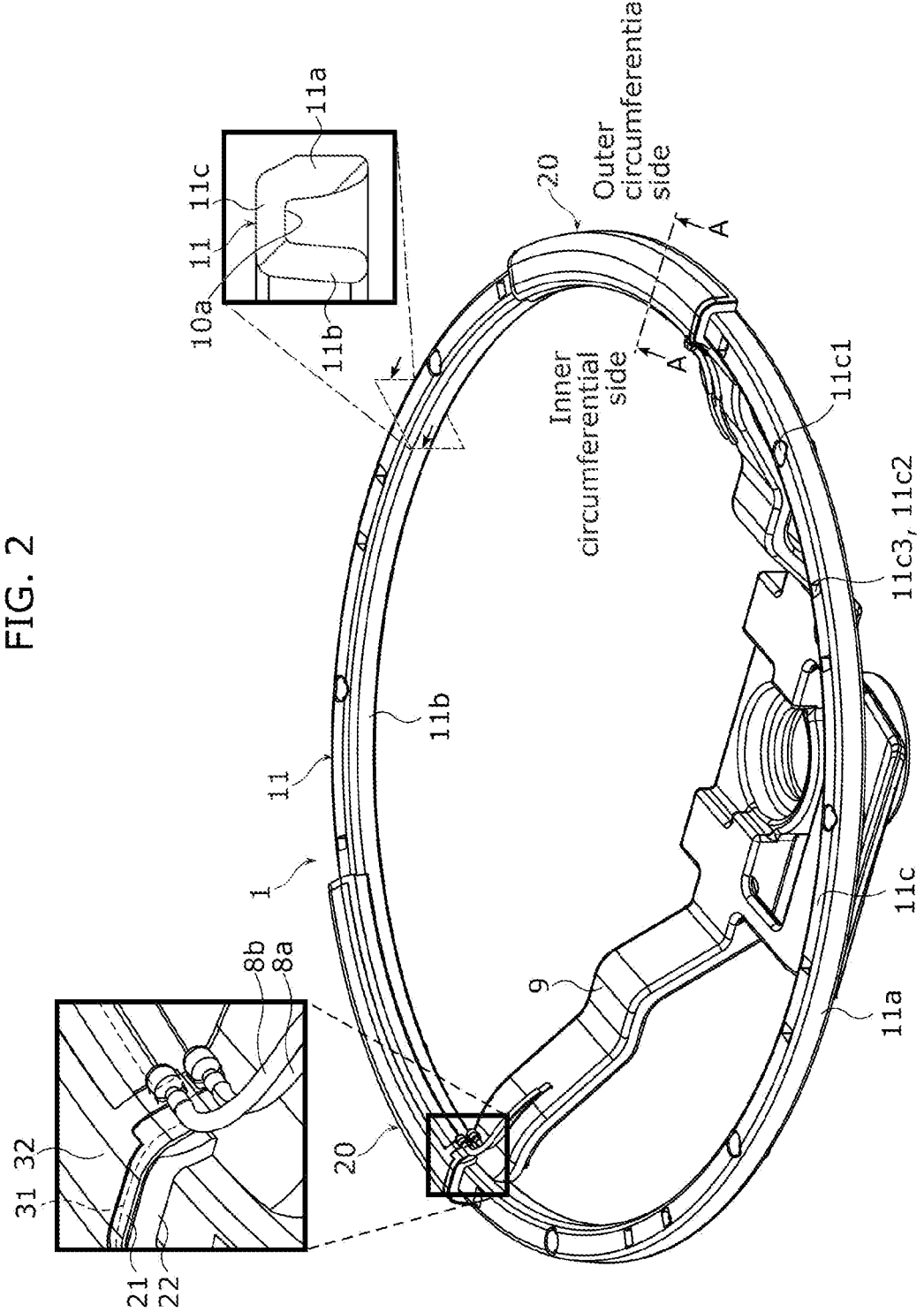
FIG. 2 is a perspective view of the steering wheel according to the embodiment.
Figure 3:
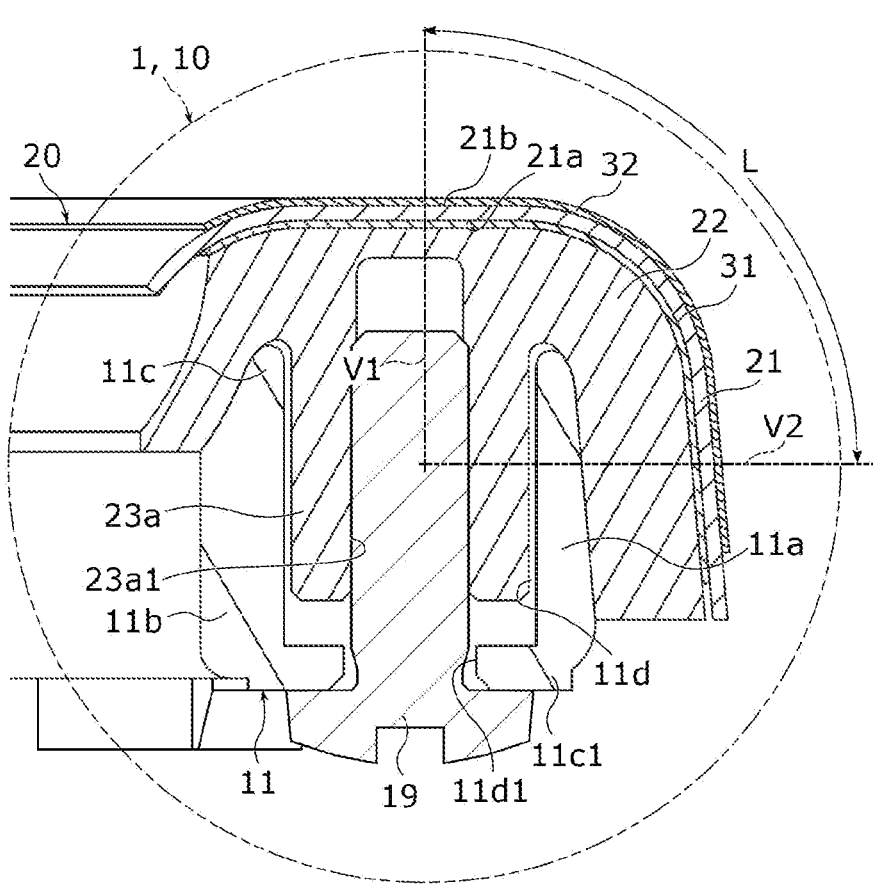
FIG. 3 is a cross sectional view of the steering wheel taken along line A-A in FIG. 2, showing a first engagement-target portion and a first engagement portion.
Figure 4:
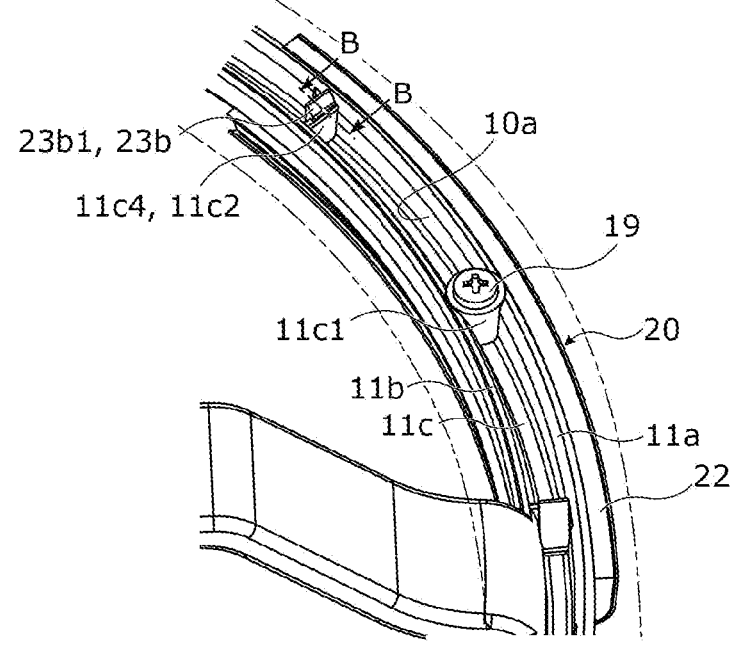
FIG. 4 is a perspective view of the steering wheel according to the embodiment, showing the first engagement-target portion, a second engagement-target portion, and a second engagement portion.
Figure 5:
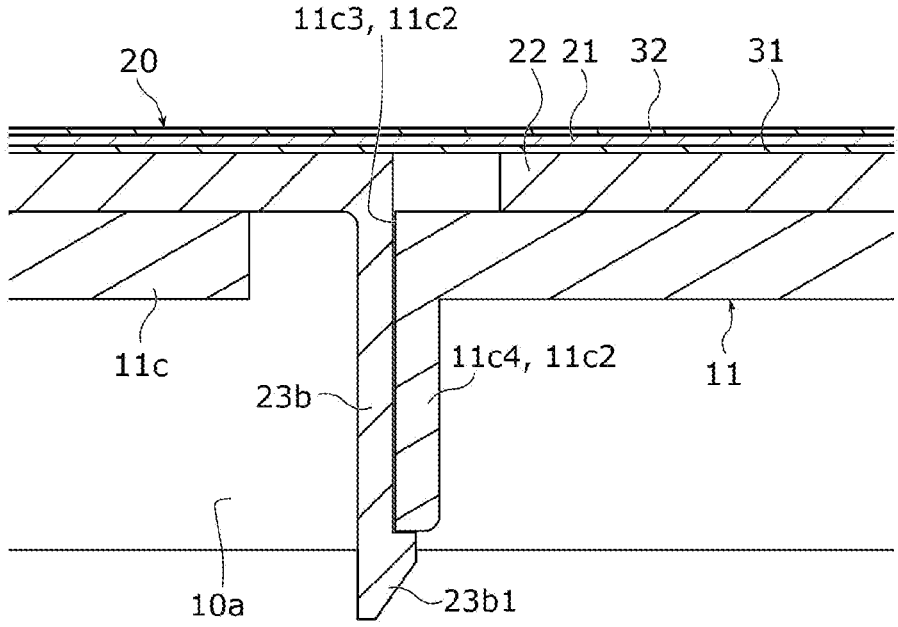
FIG. 5 is a cross sectional view of the steering wheel taken along line B-B in FIG. 4, showing the second engagement-target portion and the second engagement portion.
Figure 6:
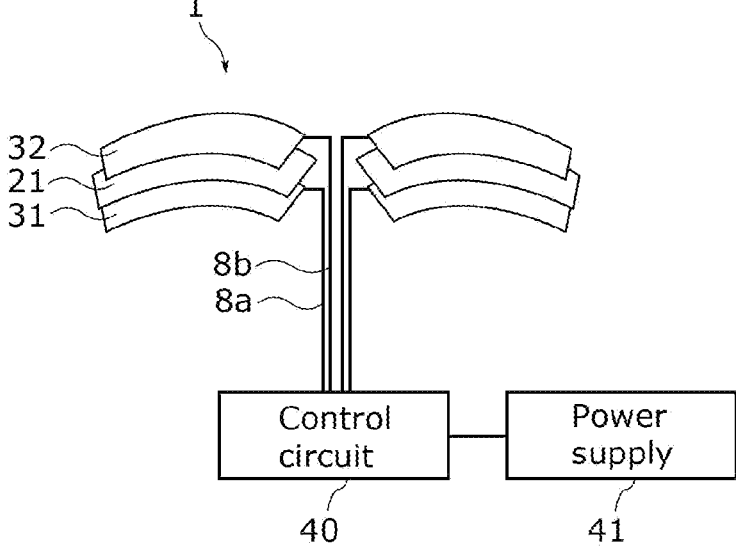
FIG. 6 is a block diagram illustrating the steering wheel according to the embodiment.

FIG. 1 is a diagram illustrating the passenger cabin of vehicle 3 in which steering wheel 1 according to the embodiment is provided. FIG. 2 is a perspective view of steering wheel 1 according to the embodiment. FIG. 2 shows an enlarged view of a portion of electrode structure 20 and a cross sectional view of core metal 11 taken at the dash-dotted line shown in FIG. 2. FIG. 3 is a cross sectional view of steering wheel 1 taken along line A-A in FIG. 2, showing first engagement-target portion 11c1 and first engagement portion 23a. FIG. 4 is a perspective view of steering wheel 1 according to the embodiment, showing first engagement-target portion 11c1, second engagement-target portion 11c2, and second engagement portion 23b. FIG. 5 is a cross sectional view of steering wheel 1 taken along line B-B in FIG. 4, showing second engagement-target portion 11c2 and second engagement portion 23b. FIG. 6 is a block diagram illustrating steering wheel 1 according to the embodiment.

As illustrated in FIG. 1, FIG. 2, and FIG. 3, steering wheel 1 imparts a steering angle to, for example, the steering of vehicle 3.

Steering wheel 1 includes rim 10. Rim 10 is integrally formed with T-shaped spoke 9 arranged on the inner circumferential surface of rim 10.

Rim 10 includes core metal 11, electrode structure 20, and foam 15 that covers electrode structure 20.

As illustrated in FIG. 2 and FIG. 3, core metal 11 is a metal annular core. More specifically, core metal 11 includes annular first portion 11a, annular second portion 11b arranged on the inner circumferential side of first portion 11a, and annular coupling portion 11c that couples first portion 11a and second portion 11b together. One end edge of first portion 11a is coupled to one end edge of coupling portion 11c, and one end edge of second portion 11b is coupled to the other end edge of coupling portion 11c. In other words, in a cross section of core metal 11 taken in a plane perpendicular to the circumferential direction of core metal 11 (hereinafter, also referred to as the cross section of core metal 11), coupling portion 11c is arranged between first portion 11a and second portion 11b. A cross section of core metal 11 taken in this manner is, for example, U-shaped, V-shaped, J-shaped, or C-shaped. In FIG. 2, core metal 11 is exemplified as having a U-shaped cross section.

Moreover, since core metal 11 has, for example, a U-shaped, V-shaped, J-shaped, or C-shaped cross section, first portion 11a, second portion 11b, and coupling portion 11c form recessed portion 10a in core metal 11. Recessed portion 10a is formed in an annular shape. In the present embodiment, the opening of recessed portion 10a is formed in rim 10 so as to open toward the front of vehicle 3 (formed so as to open on the opposite side of rim 10 relative to the side of rim 10 facing the seats).

As illustrated in FIG. 3 and FIG. 4, first engagement-target portion 11c1 and second engagement-target portion 11c2 are formed in recessed portion 10a.

First engagement-target portion 11c1 is formed in recessed portion 10a, and is a cylindrical or round tubular projection that stands upright from the rear surface of coupling portion 11c. Insertion hole 11d, in which fastener 19, such as a screw, and first engagement portion 23a of insulating support 22 are insertable, is formed on the inside of first engagement-target portion 11c1. Screw hole 11d1, in which fastener 19 is insertable, is formed in the leading end in the direction toward which first engagement-target portion 11c1 stands upright. First engagement-target portion 11c1 is included in the engagement-target portion.

As illustrated in FIG. 4 and FIG. 5, second engagement-target portion 11c2 includes insertion through-hole 11c3 and upright wall 11c4. Second engagement portion 23b of insulating support 22 is inserted in insertion through-hole 11c3. Upright wall 11c4 is formed on the rear surface of coupling portion 11c, which is on the recessed portion 10a side, and is a plate-shaped projection that stands upright from the rear surface. Upright wall 11c4 is engaged with second engagement portion 23b inserted in insertion through-hole 11c3. Second engagement-target portion 11c2 is included in the engagement-target portion.

As illustrated in FIG. 1 and FIG. 2, electrode structure 20 is a device that detects the driver's hand gripping steering wheel 1. Electrode structure 20 is arranged on the outer circumference of core metal 11 of steering wheel 1 provided in vehicle 3 to facilitate detection of the grip on steering wheel 1. More specifically, as illustrated in FIG. 3, electrode structure 20 is provided on core metal 11 so as to span from first portion 11a to second portion 11b through coupling portion 11c of core metal 11. In other words, a plurality of electrode structures 20 are provided on core metal 11, spanning from the outer circumferential side to the inner circumferential side of core metal 11 so as to cover core metal 11 except recessed portion 10a of core metal 11.

As illustrated in FIG. 6, control circuit 40, which is capable of detecting the driver's hand gripping steering wheel 1, is electrically connected to electrode structure 20. When rim 10 is gripped by the driver's hand, the capacitance between an electrode of electrode structure 20 and the hand changes. Control circuit 40 detects the driver's hand gripping steering wheel 1 based on an output signal in which the capacitance has changed. More specifically, control circuit 40 measures the capacitance of the electrode or a value (amount of change) corresponding to the capacitance, and detects the driver's hand gripping rim 10 based on the value. Control circuit 40 as described above is configured of a dedicated circuit or a general-purpose processor. Moreover, control circuit 40 is embedded in spoke 9.

Electrode structure 20 is arranged on steering wheel 1 provided in vehicle 3. In the present embodiment, electrode structure 20 is embedded in rim 10 of steering wheel 1. In FIG. 1 for example, electrode structure 20 is exemplified as being provided on both the left and right sides of rim 10. In FIG. 1 for example, a pair of electrode structures 20 are exemplified as being provided on a portion of rim 10, but this example is non-limiting. For example, three or more electrode structures 20 may be provided on rim 10, and, alternatively, one electrode structure 20 may be provided on rim 10.

More specifically, as illustrated in FIG. 2 and FIG. 3, electrode structure 20 includes first resin layer 21, insulating support 22, first electrode 31, and second electrode 32.

First resin layer 21 is arranged on the opposite side of first electrode 31 relative to the side of first electrode 31 facing insulating support 22. First resin layer 21 is arranged along the outer circumferential side surface of core metal 11 and is spaced apart from the surface of core metal 11. Here, the outer circumferential side surface of core metal 11 is, in a view of the whole annular core metal 11, the surface on the opposite side of core metal 11 relative to the inner circumferential side surface of core metal 11 on which spoke 9 is arranged.

Second electrode 32 is arranged on second surface 21b of first resin layer 21 that is the surface on the opposite side of first resin layer 21 relative to the surface of first resin layer 21 facing core metal 11. First electrode 31 is arranged on first surface 21a of first resin layer 21 facing core metal 11. Stated differently, first resin layer 21 is sandwiched between first electrode 31 and second electrode 32. First resin layer 21 as described above can arrange first electrode 31 and second electrode 32 such that first electrode 31 and second electrode 32 are spaced apart from one another and overlap one another. Accordingly, first resin layer 21 can arrange first electrode 31 and second electrode 32 above insulating support 22 without first electrode 31 and second electrode 32 being electrically connected with each other.

In the present embodiment, first resin layer 21 is arranged between first electrode 31 and second electrode 32, and extends along the lengthwise direction of first electrode 31 and second electrode 32 so as to have a length equivalent to that of first electrode 31 and second electrode 32. However, first resin layer 21 is not limited to the present embodiment. First resin layer 21 may be partially arranged between first electrode 31 and second electrode 32. In this case, first electrode 31 and second electrode 32 are, for example, metal plates each having the shape corresponding to the shape of first resin layer 21. First electrode 31 and second electrode 32 may be formed by being pressed, for example.

First resin layer 21 as described above includes a resin material such as polycarbonate, polyethylene terephthalate, polyimide, or the like.

Moreover, first resin layer 21 is film-shaped or sheet-shaped. For example, first resin layer 21 has a thickness of about several hundred micrometers (μm).

Note that first resin layer 21 may be a film-shaped or sheet-shaped double-sided adhesive tape. In this case, the double-sided adhesive tape is also to have a thickness of about several hundred μm to ensure insulation between first electrode 31 and second electrode 32. The double-sided adhesive tape includes, for example, an insulating base material, such as a nonwoven fabric or polyethylene terephthalate, on both sides of which are provided with an adhesive that is acrylic-based or the like.

Insulating support 22 is arranged on the core metal 11 side of first resin layer 21. More specifically, insulating support 22 is arranged between first electrode 31 and core metal 11. Insulating support 22 can arrange first electrode 31 on its surface without first electrode 31 and core metal 11 being electrically connected.

Moreover, insulating support 22 is arranged so as to face core metal 11 of steering wheel 1. More specifically, insulating support 22 is coupled to core metal 11, and is arranged along the outer circumferential side surface of core metal 11. Accordingly, a portion of core metal 11 is covered with first resin layer 21, first electrode 31, and second electrode 32.

Note that in the present embodiment, insulating support 22 extends along the lengthwise direction of first electrode 31 so as to fill in the space between first electrode 31 and core metal 11 and to have a length equivalent to that of first electrode 31, but the foregoing is non-limiting. Insulating support 22 may be partially arranged between first electrode 31 and core metal 11.

Moreover, as illustrated in FIG. 3, FIG. 4, and FIG. 5, insulating support 22 includes first engagement portion 23a that engages first engagement-target portion 11c1 provided on core metal 11 and second engagement portion 23b that engages second engagement-target portion 11c2. First engagement portion 23a and second engagement portion 23b are included in the engagement portion.

First engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of insulating support 22 facing core metal 11, and is fitted inside first engagement-target portion 11c1. First engagement portion 23a includes fastener hole 23a1 that corresponds to screw hole 11d1 of first engagement-target portion 11c1. First engagement portion 23a can be fastened with fastener 19 by inserting fastener 19 inserted through screw hole 11d1 of first engagement-target portion 11c1 into fastener hole 23a1 of first engagement portion 23a.

As illustrated in FIG. 4 and FIG. 5, second engagement portion 23b includes engagement claw 23b1 that engages second engagement-target portion 11c2 of core metal 11. More specifically, second engagement portion 23b includes engagement claw 23b1 that can be inserted in insertion through-hole 11c3 of second engagement-target portion 11c2 to engage upright wall 11c4 of second engagement-target portion 11c2. In other words, second engagement portion 23b is a rod-shaped or plate-shaped portion that stands upright from the surface of second insulator 22 facing core metal 11. Second engagement portion 23b is inserted in insertion through-hole 11c3 of second engagement-target portion 11c2 so that engagement claw 23b1 of second engagement portion 23b hooks onto upright wall 11c4 of second engagement-target portion 11c2. Note that in the present embodiment, engagement claw 23b1 protrudes along the circumferential direction of core metal 11, but may protrude in a direction intersecting the circumferential direction of core metal 11. Upright wall 11c4 of core metal 11 according to the present embodiment is arranged orthogonal to the circumferential direction of core metal 11, but when engagement claw 23b1 protrudes in a direction intersecting the circumferential direction of core metal 11, upright wall 11c4 may be arranged along the circumferential direction of core metal 11.

Moreover, as illustrated in FIG. 3 and FIG. 4, one or more first engagement portions 23a and one or more second engagement portions 23b are arranged on insulating support 22. In addition, a plurality of first engagement-target portions 11c1 and a plurality of second engagement-target portions 11c2 are formed on core metal 11 in accordance with the number of first engagement portions 23a and second engagement portions 23b. First engagement portion 23a, second engagement portion 23b, first engagement-target portion 11c1, and second engagement-target portion 11c2 may be arranged at approximately equal intervals on rim 10.

Moreover, insulating support 22 includes a resin material such as a rigid plastic such as polycarbonate, polybutylene terephthalate, or the like.

In addition, insulating support 22 has a certain thickness. A "certain thickness" means that insulating support 22 has a thickness of about several millimeters (mm), for example. Since insulating support 22 has a certain thickness, the rigidity of insulating support 22 is ensured.

First electrode 31 includes a metal plate. In this case, first electrode 31 is attached to first resin layer 21 by an adhesive, a double-sided adhesive tape, or the like. First electrode 31 is, for example, a metal containing copper, aluminum, or the like.

Moreover, first electrode 31 is arranged on first surface 21a of first resin layer 21 that is the surface on the opposite side of first resin layer 21 relative to second surface 21b of first resin layer 21. More specifically, first electrode 31 is arranged along first surface 21a of first resin layer 21 so as to sandwich first resin layer 21 with second electrode 32. Accordingly, since first electrode 31 is sandwiched between first resin layer 21 and insulating support 22, first electrode 31 can be said to be arranged on the surface of insulating support 22 that faces first resin layer 21. Since first electrode 31 is arranged spaced apart from core metal 11 and second electrode 32, first electrode 31 is not electrically connected with core metal 11 and second electrode 32.

Second electrode 32 includes a metal plate. When second electrode 32 is a metal plate, the metal plate is attached to second surface 21b of first resin layer 21 by an adhesive or the like. Second electrode 32 is, for example, a metal containing copper, aluminum, or the like.

Moreover, second electrode 32 is arranged on second surface 21b of first resin layer 21 that is on the opposite side of first resin layer 21 relative to the surface of first resin layer 21 facing first electrode 31. More specifically, second electrode 32 is arranged along second surface 21b of first resin layer 21 so as to sandwich first resin layer 21 with first electrode 31.

Moreover, first electrode 31 and second electrode 32 are arranged along the shape of insulating support 22. For this reason, the shape of first electrode 31 and the shape of second electrode 32 correspond to the shape of insulating support 22. In this case, the shape of first resin layer 21 arranged between first electrode 31 and second electrode 32 corresponds to the shape of first electrode 31 and the shape of second electrode 32. First resin layer 21 may be formed by vacuum forming or the like. In other words, first electrode 31, second electrode 32, and first resin layer 21 are formed in accordance with the size and shape of insulating support 22.

Moreover, first electrode 31, first resin layer 21, second electrode 32, and insulating support 22 may be integrally formed, and, alternatively, may be formed as individual separable elements.

First electrode 31 is electrically connected with harness 8a, and second electrode 32 is electrically connected with harness 8b.

As illustrated in FIG. 2, harness 8a is electrically connected with first electrode 31 of electrode structure 20 and also with control circuit 40. Harness 8a and first electrode 31 may be electrically connected by soldering harness 8a and first electrode 31 together. Alternatively, harness 8a and first electrode 31 may be electrically connected by crimping harness 8a and first electrode 31 with a rivet or an eyelet.

Harness 8b is electrically connected with second electrode 32 of electrode structure 20 and also with control circuit 40. Harness 8b and second electrode 32 may be electrically connected by soldering harness 8b and second electrode 32 together. Alternatively, harness 8b and second electrode 32 may be electrically connected by crimping harness 8b and second electrode 32 with a rivet or an eyelet.

An AC voltage is applied to first electrode 31 and second electrode 32. An AC voltage having the same phase may be applied to first electrode 31 and second electrode 32. In addition, an AC voltage to be applied to first electrode 31 and second electrode 32 is generated in control circuit 40 by electric power supplied from power supply 41 illustrated in FIG. 6.

The application of an AC voltage having the same phase to first electrode 31 and second electrode 32 can cancel out or reduce the capacitance formed between first electrode 31 and core metal 11. Accordingly, control circuit 40 can accurately detect the capacitance formed between second electrode 32 and the driver's hand.

Here, since second electrode 32 is arranged on second surface 21b of first resin layer 21, when the part of rim 10 on which second electrode 32 is arranged is gripped by the driver's hand, a capacitance is formed between second electrode 32 and the driver's hand. Control circuit 40 can therefore detect the driver's hand gripping rim 10 based on the change in capacitance.

As illustrated in FIG. 3, in first electrode 31 and second electrode 32, when first electrode 31 and second electrode 32 overlap, the surface area of first surface 21a covered by first electrode 31 is greater than the surface area of second surface 21b covered by second electrode 32. For this reason, first electrode 31 can inhibit the formation of capacitance between second electrode 32 and core metal 11.

In a cross section of steering wheel 1 taken in a plane perpendicular to the circumferential direction of rim 10 of steering wheel 1 (hereinafter also referred to as the cross section of rim 10), insulating support 22, first electrode 31, first resin layer 21, and second electrode 32 are arranged at least in the range from the outer circumferential side portion of rim 10 of steering wheel 1 to the portion of rim 10 facing the rear of vehicle 3.

In the present embodiment, insulating support 22, first electrode 31, first resin layer 21, and second electrode 32 are arranged along the circumferential direction of the cross section of rim 10 over a range of at least ¼th of the circumference. As illustrated in FIG. 3, first electrode 31, first resin layer 21, and second electrode 32 are arranged over a range greater than range L between the two straight lines V1 and V2 denoted by chain double-dashed lines. More specifically, insulating support 22, first electrode 31, first resin layer 21, and second electrode 32 are arranged spanning from first portion 11a to second portion 11b through coupling portion 11c of rim 10. In this way, first electrode 31, first resin layer 21, and second electrode 32 are arranged in locations easily contacted by the driver's hand when the driver's hand grips rim 10, whereby the driver's grip on steering wheel 1 can be accurately detected by electrode structure 20.

As illustrated in FIG. 3, foam 15 is the portion that the driver grips with their hand, and forms the outer shell of rim 10 on steering wheel 1. Foam 15 includes a resin material of urethane resin such as polyurethane foam that covers electrode structure 20. Core metal 11, insulating support 22, first electrode 31, first resin layer 21, and second electrode 32 are embedded in foam 15. In other words, core metal 11, insulating support 22, first electrode 31, first resin layer 21, and second electrode 32 are covered by foam 15 so as not to be exposed from foam 15.

Electrode structure 20 as described above can be assembled to core metal 11 as follows.

First engagement-target portion 11c1 of core metal 11 engages first engagement portion 23a of insulating support 22. In other words, first engagement portion 23a is caused to engage first engagement-target portion 11c1, and first engagement portion 23a and first engagement-target portion 11c1 are fastened together by fastener 19 inserted in screw hole 11d1 of first engagement-target portion 11c1 and fastener hole 23a1 of first engagement portion 23a.

Second engagement-target portion 11c2 of core metal 11 engages second engagement portion 23b of insulating support 22. In other words, engagement claw 23b1 of second engagement portion 23b included in electrode structure 20 is caused to engage second engagement-target portion 11c2 provided on core metal 11. This yields a structure in which electrode structure 20 is fastened to core metal 11.

Next, the structure is fixed in the cavity of a mold and the mold is clamped. The structure is covered using foam 15 while electrode structure 20 and core metal 11 are fastened together. Polyol and isocyanate are poured into the cavity in the mold through a gate formed in the mold to form foam 15 that covers the structure. Chemical reaction between polyol and isocyanate produces polyurethane foam.

In this way, foam 15 can cover electrode structure 20 and core metal 11 while electrode structure 20 is engaged with core metal 11. This yields steering wheel 1.

Advantageous Effects

Next, the advantageous effects of electrode structure 20 according to the present embodiment will be described.

For example, in PTL 1, making the cut in the foam of the steering wheel and inserting the conductor of the sensor inside increase man-hours, so the conventional technique can be improved upon in terms of steering wheel manufacturing cost.

In view of the above, electrode structure 20 according to the present embodiment, as has been described above, includes: insulating support 22 that is arranged so as to face core metal 11 of steering wheel 1; first electrode 31 that is arranged on an opposite side of insulating support 22 relative to a side of insulating support 22 facing core metal 11, and includes a metal plate; first resin layer 21 that is arranged on an opposite side of first electrode 31 relative to a side of first electrode 31 facing insulating support 22; and second electrode 32 that is arranged on an opposite side of first resin layer 21 relative to a side of first resin layer 21 facing first electrode 31, and includes a metal plate. Insulating support 22 includes an engagement portion that engages an engagement-target portion provided on core metal 11.

According to the above, electrode structure 20 can be attached to core metal 11 by causing the engagement portion of insulating support 22 to engage the engagement-target portion provided on core metal 11. In this way, electrode structure 20 can be arranged inside steering wheel 1. Accordingly, the first electrode and the second electrode need not be arranged inside the steering wheel after forming the steering wheel and making a cut in the steering wheel.

Moreover, the engagement between the engagement-target portion and the engagement portion can fasten electrode structure 20 to core metal 11. For this reason, it is possible to inhibit electrode structure 20 from being displaced with respect to core metal 11 or being rotationally displaced with respect to the circumferential direction of steering wheel 1 due to pressure at the time of forming foam 15 of steering wheel 1.

Electrode structure 20 can therefore reduce an increase in the cost of manufacturing steering wheel 1.

In particular, since it is possible to inhibit electrode structure 20 from being displaced with respect to core metal 11 or being rotationally displaced with respect to the circumferential direction of steering wheel 1, variations in sensitivity due to the gripping position of the driver's hand on steering wheel 1 can be inhibited.

In electrode structure 20 according to the present embodiment, the shape of first electrode 31 and the shape of second electrode 32 correspond to the shape of insulating support 22.

With this, the rigidity of first electrode 31 and second electrode 32 is ensured. Accordingly, first electrode 31 and second electrode 32 can be assembled to insulating support 22 while maintaining the positions of first electrode 31 and second electrode 32 in electrode structure 20.

In electrode structure 20 according to the present embodiment, the shape of first resin layer 21 also corresponds to the shape of first electrode 31 and the shape of second electrode 32.

With this, the rigidity of first resin layer 21, as well as the rigidity of first electrode 31 and second electrode 32, is ensured. Accordingly, first electrode 31, first resin layer 21, and second electrode 32 can be assembled to insulating support 22 in electrode structure 20 while maintaining the positions of first electrode 31, first resin layer 21, and second electrode 32.

In electrode structure 20 according to the present embodiment, first resin layer 21 is sheet-shaped or film-shaped.

With this, the sheet-shaped or film-shaped first resin layer 21 can be arranged between first electrode 31 and second electrode 32. Accordingly, the inhibition of an electrical connection between first electrode 31 and second electrode 32 can detect the driver's hand gripping steering wheel 1, and can also reduce an increase in the thickness of first electrode 31, first resin layer 21, and second electrode 32.

In electrode structure 20 according to the present embodiment, first resin layer 21 is a double-sided adhesive tape including an insulating base material.

According to the above, first electrode 31 and second electrode 32 can be easily stacked, and an increase in the thickness of first electrode 31, first resin layer 21, and second electrode 32 can also be reduced.

Variation of Embodiment

First, electrode structure 20a according to the variation will be described with reference to FIG. 7 through FIG. 10.

Figure 7:
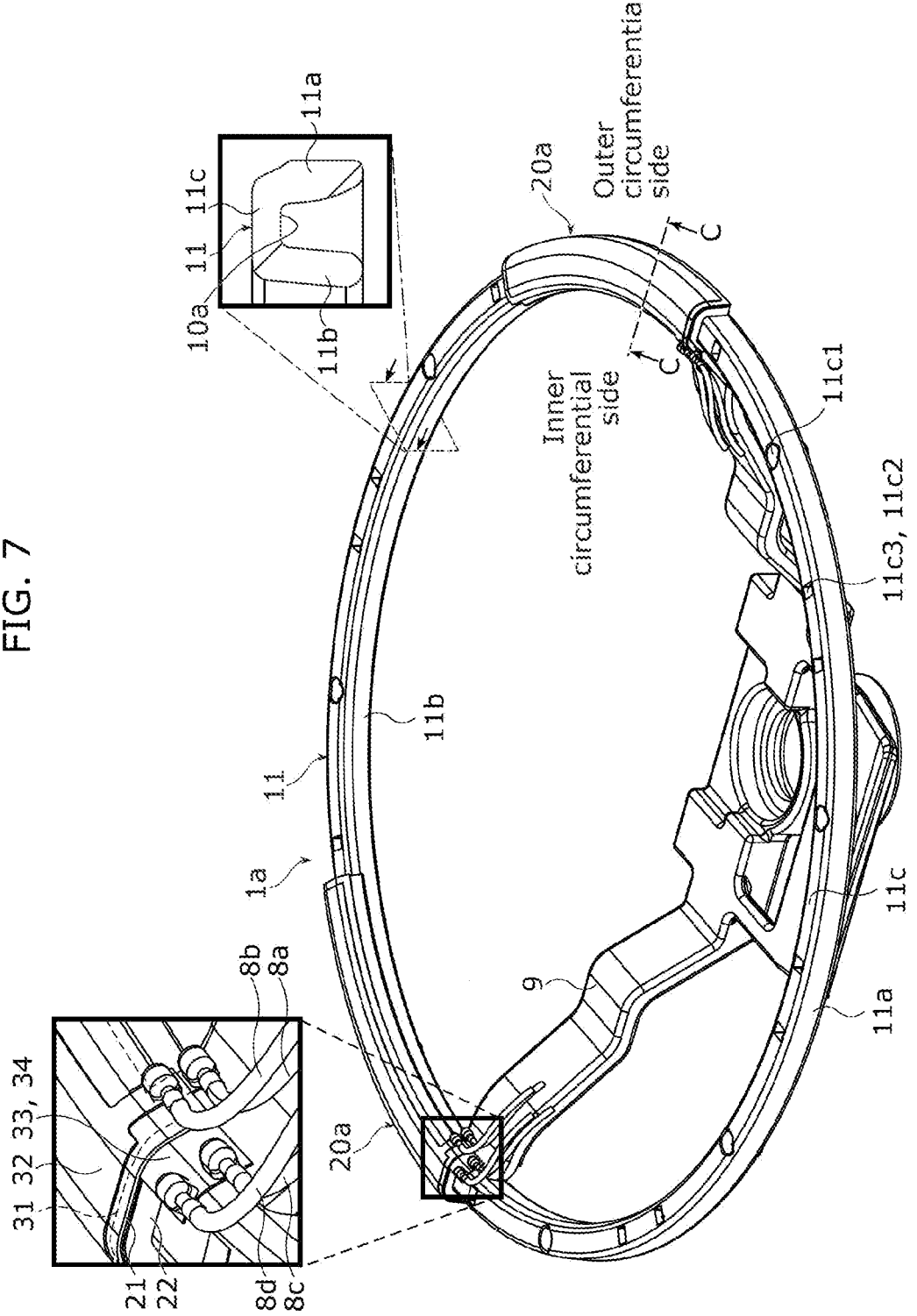
FIG. 7 is a perspective view of a steering wheel according to a variation of the embodiment.
Figure 8:
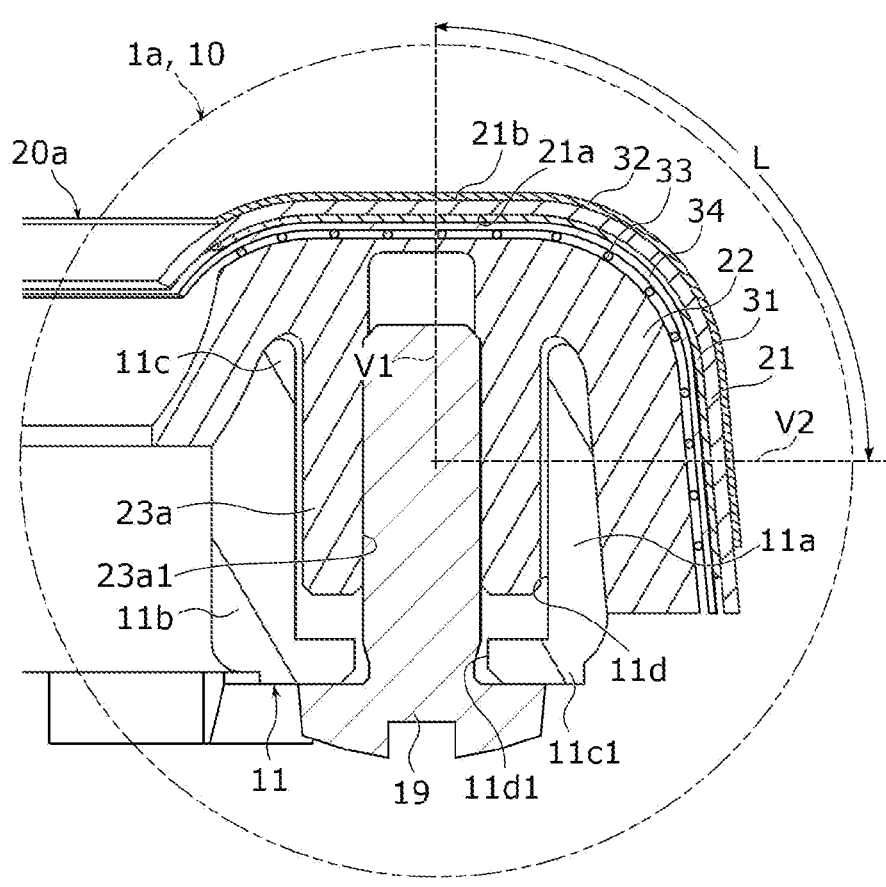
FIG. 8 is a cross sectional view of the steering wheel taken along line C-C in FIG. 7, showing the first engagement-target portion and the first engagement portion.
Figure 9A:
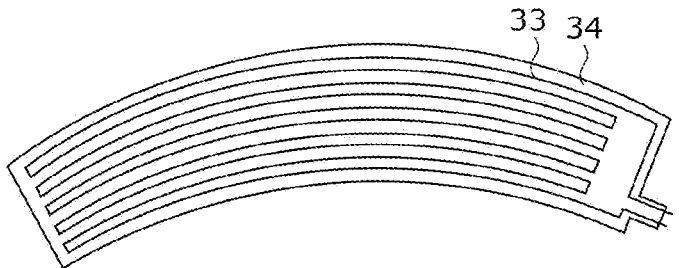
FIG. 9A is a plan view of a heater according to the variation of the embodiment.
Figure 9B:
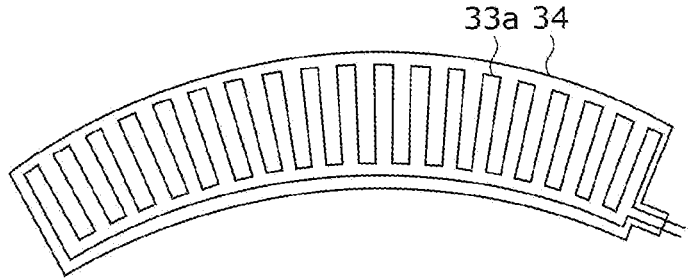
FIG. 9B is a plan view of another heater according to the variation of the embodiment.
Figure 10:
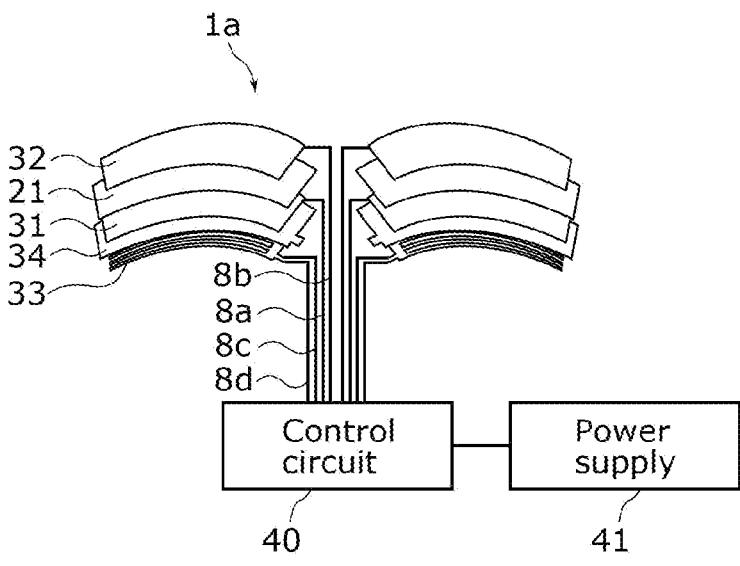
FIG. 10 is a block diagram illustrating the steering wheel according to the variation of the embodiment.

FIG. 7 is a perspective view of steering wheel 1a according to the variation of the embodiment. FIG. 8 is a cross sectional view of steering wheel 1a taken along line C-C in FIG. 7, showing first engagement-target portion 11c1 and first engagement portion 23a. FIG. 9A is a plan view of heater 33 according to the variation of the embodiment. FIG. 9B is a plan view of another heater 33a according to the variation of the embodiment. FIG. 10 is a block diagram illustrating steering wheel 1a according to the variation of the embodiment.

The present variation is different from the embodiment in that electrode structure 20a includes heater 33. Other elements in the present variation are the same as those in the embodiment unless particularly specified. The elements that are essentially the same share like reference numerals to omit or simplify detailed description of the elements.

As illustrated in FIG. 7 and FIG. 8, electrode structure 20a further includes heater 33 and second resin layer 34.

Heater 33 is arranged between insulating support 22 and first electrode 31, and is arranged so as to face insulating support 22.

Heater 33 may be a conducting wire. In this case, as illustrated in FIG. 9A, heater 33 may be sewn on one surface of second resin layer 34 as one piece composed of a series of zigzags formed by line portions along the circumferential direction of core metal 11 and U-turn portions so as to form a serpentine pattern. Note that, as illustrated in FIG. 9B, heater 33 may form a serpentine pattern in which the line portions are approximately parallel to a direction orthogonal to the circumferential direction of core metal 11.

Heater 33 is a metal wire containing, copper, aluminum, silver, or the like. Note that heater 33 may include a metal thin film formed through, for instance, application of conductive ink on second resin layer 34 or etching.

Heater 33 is electrically connected with harnesses 8c and 8d.

As illustrated in FIG. 7, harnesses 8c and 8d are electrically connected with heater 33 of electrode structure 20a. More specifically, harness 8c and heater 33 may be electrically connected by soldering harness 8c and the first terminal of heater 33 together. In addition, harness 8d and heater 33 may be electrically connected by soldering harness 8d and the second terminal of heater 33 together. Moreover, harness 8c and heater 33 may be electrically connected by crimping harness 8c and the first terminal of heater 33 with a rivet or an eyelet. In addition, harness 8d and heater 33 may be electrically connected by crimping harness 8d and the second terminal of heater 33 with a rivet or an eyelet.

As illustrated in FIG. 10, harnesses 8c and 8d are electrically connected with control circuit 40. A DC voltage from control circuit 40 is applied to heater 33. The DC voltage to be applied to heater 33 is generated in power supply 41. Since heater 33 can generate heat by electric power from power supply 41 to warm the surface of rim 10, the hand gripping rim 10 can be warmed.

As illustrated in FIG. 8, second resin layer 34 is a base material for arranging heater 33 on one surface of second resin layer 34. Second resin layer 34 is arranged between insulating support 22 and first electrode 31. More specifically, second resin layer 34 is arranged between heater 33 and first electrode 31, and is arranged such that one surface of second resin layer 34 supports heater 33 and the other surface of second resin layer 34 on the opposite side of second resin layer 34 relative to the one surface of second resin layer 34 faces first electrode 31.

In addition, second resin layer 34 is sheet-shaped or film-shaped. The shape of second resin layer 34 corresponds to the shape of insulating support 22. Second resin layer 34 may be formed by vacuum forming or the like. In other words, second resin layer 34 is formed in accordance with the size and shape of insulating support 22.

Second resin layer 34 includes a resin material such as polycarbonate, polyethylene terephthalate, polyimide, or the like.

Note that second resin layer 34 may be, as first resin layer 21 has been described, a film-shaped or sheet-shaped double-sided adhesive tape. In this case, heater 33 is, for example, a thin metal plate formed into the shape shown in FIG. 9A or FIG. 9B by etching so as to be affixed to one surface of the double-sided adhesive tape.

Advantageous Effects

The advantageous effects of electrode structure 20a according to the present embodiment will be described.

As has been described above, electrode structure 20a according to the present embodiment further includes heater 33 and second resin layer 34 that are arranged between insulating support 22 and first electrode 31 between core metal 11 and foam 15. Heater 33 is arranged so as to face insulating support 22. Second resin layer 34 is arranged such that one surface of second resin layer 34 supports heater 33 and the other surface of second resin layer 34 faces first electrode 31. The other surface is on the opposite side of second resin layer 34 relative to the one surface supporting the heater.

According to the above, second resin layer 34 is arranged between heater 33 and first electrode 31. Accordingly, heater 33 and first electrode 31 are caused not to be electrically connected with each other. It is therefore possible to simultaneously fulfill the function of heater 33 and the function of detecting the driver's hand gripping steering wheel 1a.

Moreover, since second resin layer 34, first electrode 31, first resin layer 21, and second electrode 32 are arranged on the opposite side of heater 33 relative to the side of heater 33 facing insulating support 22, when first electrode 31 and second electrode 32 are heated by heater 33, a thermal diffusion effect in first electrode 31 and second electrode 32 can inhibit temperature variations of the surface of steering wheel 1a.

In electrode structure 20a according to the present embodiment, the shape of second resin layer 34 corresponds to the shape of insulating support 22.

With this, the rigidity of second resin layer 34 is ensured. Accordingly, heater 33 can be supported in electrode structure 20a while maintaining the position of second resin layer 34. Second resin layer 34 supporting heater 33 can therefore be assembled to insulating support 22.

In electrode structure 20a according to the present embodiment, second resin layer 34 is sheet-shaped or film-shaped.

With this, it is possible to reduce the thickness of second resin layer 34 arranged on the opposite side of heater 33 relative to the side of heater 33 facing insulating support 22. Accordingly, the heat of heater 33 can be easily conducted to first electrode 31.

Moreover, when first resin layer 21 is sheet-shaped or film-shaped, an increase in the thickness of second resin layer 34, first electrode 31, first resin layer 21, and second electrode 32 can be reduced. Accordingly, the heat produced when heater 33 is heated is easily conducted to the surface of steering wheel 1a. It is therefore possible to reduce an increase in the time required for warming the surface of steering wheel 1a.

In electrode structure 20a according to the present embodiment, second resin layer 34 is a double-sided adhesive tape including an insulating base material.

According to the above, first electrode 31 and heater 33 can be easily stacked, and an increase in the thickness of heater 33, second resin layer 34, and first electrode 31 can also be reduced.

Other Variations

Hereinbefore, the electrode structure according to the present disclosure has been described based on the embodiments described above; however, the present disclosure is not limited to these embodiments. Embodiments achieved at by a person of skill in the art making various modifications to the embodiments which do not depart from the spirit of the present disclosure may be included in the present disclosure.

In such electrode structures according to the above-described embodiments, the heater and the second resin layer are arranged so as to face the insulating support.

For example, by placing an insulating support having a heater on its surface inside a cavity formed by a mold and pouring resin into the inside of the cavity to form a second resin layer on the insulating support, the heater and the second resin layer can be arranged to have the shape formed along the surface of the insulating support.

Moreover, since insulating support 22, heater 33, and second resin layer 34 can be integrally formed, this configuration can be assembled to core metal 11. Accordingly, assembly errors that occur when the heater and the second resin layer are assembled to the insulating support can be reduced.

Moreover, first electrode 31, first resin layer 21, second electrode 32, heater 33, and second resin layer 34 may be integrally formed, and, alternatively, may be formed as individual separable elements.

In the electrode structure according to the above-described embodiments, the core metal includes the first engagement-target portion and second engagement-target portion, but the core metal is not limited to the foregoing. For example, the core metal need not include the first engagement-target portion, but may include the second engagement-target portion. In this case, the electrode structure need not include the first engagement portion, but may include the second engagement portion. Moreover, the core metal need not include the second engagement-target portion, but may include the first engagement-target portion. In this case, the electrode structure need not include the second engagement portion, but may include the first engagement portion.

In the electrode structure according to the above-described embodiments, a plurality electrode structures may be connected with each other along the circumferential direction of the core metal. For example, the electrode structure may be connected with another electrode structure. In this case, each of the harnesses may be electrically connected individually with a different one of the first electrodes and the second electrodes.

In the electrode structure according to the embodiment, the core metal may be inverted so that the core metal has plane symmetry with respect to the plane of the opening on the inner circumferential side of the core metal, and the position at which the electrode structure is attached to the core metal may also be inverted. In other words, the core metal may be fixed to the spoke such that the opening of the recessed portion in the core metal faces the driver's seat. In addition, the electrode structure may be attached to the side of the core metal that faces toward the front of a vehicle so as to cover the recessed portion of the core metal.

Note that embodiments achieved by applying various modifications conceived by a person skilled in the art to the embodiment as well as embodiments achieved by discretionarily combining elements and functions of the embodiment are also included in the present disclosure, so long as they do not depart from the spirit of the present disclosure.

SUPPLEMENTARY NOTES

The following lists the features of the electrode structure described based on the above-described embodiments.

<Technical Aspect 1>

An electrode structure comprising:

an insulating support that is arranged so as to face a core metal of a steering wheel;

a first electrode that is arranged on an opposite side of the insulating support relative to a side of the insulating support facing the core metal, and includes a metal plate;

a first resin layer that is arranged on an opposite side of the first electrode relative to a side of the first electrode facing the insulating support; and a second electrode that is arranged on an opposite side of the first resin layer relative to a side of the first resin layer facing the first electrode, and includes a metal plate, wherein the insulating support includes an engagement portion that engages an engagement-target portion provided on the core metal.

<Technical Aspect 2>

The electrode structure according to Technical Aspect 1, further comprising:

a heater and a second resin layer that are arranged between the insulating support and the first electrode, wherein the heater is arranged so as to face the insulating support, and the second resin layer is arranged such that one surface of the second resin layer supports the heater and an other surface of the second resin layer faces the first electrode, the other surface being on an opposite side of the second resin layer relative to the one surface supporting the heater.

<Technical Aspect 3>

The electrode structure according to Technical Aspect 1 or 2, wherein a shape of the first electrode and a shape of the second electrode correspond to a shape of the insulating support.

<Technical Aspect 4>

The electrode structure according to Technical Aspect 3, wherein a shape of the first resin layer corresponds to the shape of the first electrode and the shape of the second electrode.

<Technical Aspect 5>

The electrode structure according to Technical Aspect 2, wherein a shape of the second resin layer corresponds to a shape of the insulating support.

<Technical Aspect 6>

The electrode structure according to Technical Aspect 2 or 5, wherein the heater and the second resin layer are arranged so as to face the insulating support.

<Technical Aspect 7>

The electrode structure according to any one of Technical Aspects 1 to 6, wherein the first resin layer is sheet-shaped or film-shaped.

<Technical Aspect 8>

The electrode structure according to any one of Technical Aspects 2, 5, and 6, wherein the second resin layer is sheet-shaped or film-shaped.

<Technical Aspect 9>

The electrode structure according to Technical Aspect 7, wherein the first resin layer is a double-sided adhesive tape including an insulating base material.

<Technical Aspect 10>

The electrode structure according to Technical Aspect 8, wherein the second resin layer is a double-sided adhesive tape including an insulating base material.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-060880 filed Apr. 4, 2023.

INDUSTRIAL APPLICABILITY

The electrode structure according to the present disclosure is applicable to, for example, a steering wheel or the like of a vehicle.

The invention claimed is:

1. An electrode structure comprising:

an insulating support that is arranged so as to face a core metal of a steering wheel;

a first electrode that is arranged on an opposite side of the insulating support relative to a side of the insulating support facing the core metal, and includes a metal plate;

a first resin layer that is arranged on an opposite side of the first electrode relative to a side of the first electrode facing the insulating support; and a second electrode that is arranged on an opposite side of the first resin layer relative to a side of the first resin layer facing the first electrode, and includes a metal plate, wherein the insulating support includes an engagement portion that engages an engagement-target portion provided on the core metal, and the engagement portion includes a fastener hole into which a fastener is inserted to fasten the engagement portion to the engagement-target portion of the core metal.

2. The electrode structure according to claim 1, further comprising:

a heater and a second resin layer that are arranged between the insulating support and the first electrode, wherein the heater is arranged so as to face the insulating support, and the second resin layer is arranged such that one surface of the second resin layer supports the heater and an other surface of the second resin layer faces the first electrode, the other surface being on an opposite side of the second resin layer relative to the one surface supporting the heater.

3. The electrode structure according to claim 1, wherein a shape of the first electrode and a shape of the second electrode correspond to a shape of the insulating support.

4. The electrode structure according to claim 3, wherein a shape of the first resin layer corresponds to the shape of the first electrode and the shape of the second electrode.

5. The electrode structure according to claim 2, wherein a shape of the second resin layer corresponds to a shape of the insulating support.

6. The electrode structure according to claim 2, wherein the heater and the second resin layer are arranged so as to face the insulating support.

7. The electrode structure according to claim 1, wherein the first resin layer is sheet-shaped or film-shaped.

8. The electrode structure according to claim 2, wherein the second resin layer is sheet-shaped or film-shaped.

9. The electrode structure according to claim 7, wherein the first resin layer is a double-sided adhesive tape including an insulating base material.

10. The electrode structure according to claim 8, wherein the second resin layer is a double-sided adhesive tape including an insulating base material.

11. The electrode structure according to claim 1, wherein the engagement portion is fastened to the engagement-target portion by inserting the fastener through the engagement-target portion into the fastener hole of the engagement portion.

12. The electrode structure according to claim 1, wherein the engagement portion includes an engagement claw that is inserted into a hole of the engagement-target portion and engages an upright wall of the engagement-target portion.

* * * * *